US011829127B2

(12) United States Patent
Obstfeld et al.

(10) Patent No.: US 11,829,127 B2
(45) Date of Patent: Nov. 28, 2023

(54) OPPORTUNISTIC INFORMATION AND INVENTORY EXCHANGE VIA SERENDIPITOUS ENCOUNTERS OF AUTONOMOUS MOBILE ROBOTS

(71) Applicant: Cisco Technology, Inc., San Jose, CA (US)

(72) Inventors: Joel Obstfeld, Bushey (GB); Pete Rai, Egham (GB); Guillaume Sauvage De Saint Marc, Sevres (FR)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 17/104,901

(22) Filed: Nov. 25, 2020

(65) Prior Publication Data

US 2022/0161429 A1    May 26, 2022

(51) Int. Cl.
*G05B 19/418* (2006.01)
*B25J 9/16* (2006.01)
(Continued)

(52) U.S. Cl.
CPC . *G05B 19/41895* (2013.01); *G05B 19/41865* (2013.01); *B25J 9/163* (2013.01);
(Continued)

(58) Field of Classification Search
CPC .. G05D 1/0027; G05D 1/0022; G05D 1/0291; G05D 1/0297; G05D 1/0287; G05D 1/0276; G05D 2201/0216; G06Q 50/28; G06Q 10/06; G06Q 10/08; G06Q 10/0631; G06Q 10/063116; B65G 1/0492; B65G 1/1373; G05B 19/41865; G05B 19/41895;
(Continued)

(56) References Cited

U.S. PATENT DOCUMENTS 7,751,928 B1 * 7/2010 Antony ............... G06Q 10/087
700/214
9,786,187 B1 * 10/2017 Bar-Zeev ............... G05D 1/104
(Continued)

FOREIGN PATENT DOCUMENTS

JP    H10254545 A  * 9/1998  ............... G05D 1/02

OTHER PUBLICATIONS

Draganjac, et al., "Decentralized Control of Multi-AGV Systems in Autonomous Warehousing Applications", IEEE Transactions on Automation Science and Engineering, vol. 13, No. 4, Oct. 2016, pp. 1433-1447, IEEE.
(Continued)

*Primary Examiner* — Abby Y Lin
*Assistant Examiner* — Karston G. Evans
(74) *Attorney, Agent, or Firm* — BEHMKE INNOVATION GROUP LLC; Kenneth J. Heywood; James J. Wong

(57) ABSTRACT

According to one or more embodiments of the disclosure, a first autonomous mobile robot (AMR) encounters a second AMR, while navigating a location. The first AMR receives, from the second AMR, a task list of the second AMR. The first AMR determines an adjustment to the task list of the second AMR, based in part on a comparison between the task list of the second AMR and a task list maintained by the first AMR. The first AMR sends, to the second AMR, the adjustment to the task list of the second AMR.

20 Claims, 7 Drawing Sheets

(51) Int. Cl.
  *G06Q 10/0631* (2023.01)
  *B65G 1/04* (2006.01)
  *G06Q 10/08* (2023.01)

(52) U.S. Cl.
  CPC ............ *B25J 9/1661* (2013.01); *B25J 9/1682* (2013.01); *B65G 1/0492* (2013.01); *G05D 2201/0216* (2013.01); *G06Q 10/063116* (2013.01); *G06Q 10/08* (2013.01)

(58) Field of Classification Search
  CPC .......... G05B 2219/32243; B25J 9/1661; B25J 9/163; B25J 9/1682
  See application file for complete search history.

(56) References Cited

U.S. PATENT DOCUMENTS

| | | | |
|---|---|---|---|
| 10,235,642 | B2 | 3/2019 | Kattepur et al. |
| 2015/0269520 | A1* | 9/2015 | Knapp ............ G06Q 10/08355 705/338 |
| 2018/0039258 | A1 | 2/2018 | Zou |
| 2019/0043001 | A1* | 2/2019 | Woulfe ............. G01C 21/3438 |
| 2019/0152703 | A1* | 5/2019 | Sellner ................ B65G 1/1373 |
| 2019/0259120 | A1 | 8/2019 | Mattingly et al. |
| 2019/0392371 | A1* | 12/2019 | Kline ................. G06Q 10/083 |
| 2020/0172339 | A1* | 6/2020 | Theobald ............ G05D 1/0088 |
| 2020/0198894 | A1 | 6/2020 | Jarvis et al. |
| 2021/0292090 | A1* | 9/2021 | Tazume ............... G05D 1/0291 |
| 2022/0147059 | A1* | 5/2022 | Borne-Pons .......... G06Q 10/06 |

OTHER PUBLICATIONS

Coltin, et al. "Online Pickup and Delivery Planning with Transfers for Mobile Robots", 2014 IEEE International Conference on Robotics & Automation (ICRA), May-Jun. 2014, pp. 5786-5791, IEEE.
"AGV vs. AMR—What's the Difference", online: https://www.mobile-industrial-robots.com/en/insights/get-started-with-amrs/agv-vs-amr-whats-the-difference, printed Nov. 16, 2020, 3 pages, Mobile Industrial Robots A/S.
"Material Handling Transformed: VirtualConveyor From Fetch Robotics", online: https://fetchrobotics.com/products-technology/virtualconveyor/, 6 pages, printed Nov. 2020, FetchRobotics.
Ghaffarzadeh, et al., "Mobile Robots, Autonomous Vehicles, and Drones in Logistics, Warehousing, and Delivery 2020-2040", online: https://www.idtechex.com/en/research-report/mobile-robots-autonomous-vehicles-and-drones-in-logistics-warehousing-and-delivery-2020-2040/706, Printed Nov. 2020, 12 pages, IDTechEx.
"Mobile Robots Grow Up", online: https://www.roboticsbusinessreview.com/wp-content/uploads/2019/04/RBR_Mobile-Robots-Grow-Up_Final.pdf, printed Nov. 2020, 16 pages, Robotics Business Review Whitepaper.

* cited by examiner

OPPORTUNISTIC INFORMATION AND INVENTORY EXCHANGE VIA SERENDIPITOUS ENCOUNTERS OF AUTONOMOUS MOBILE ROBOTS

TECHNICAL FIELD

The present disclosure relates generally to computer networks, and, more particularly, to opportunistic information and inventory exchange via serendipitous encounters of automated mobile robots.

BACKGROUND

Modern warehouses are striving to improve productivity and efficiency. Key performance indicators in this context include "dock to dock time" (e.g., the amount of time between goods arriving and departing) and "pick and pack performance" (e.g., the amount of time taken between selecting an item and the item being ready for dispatch). To improve performance, warehouse operators are increasingly turning to the use of automation systems. These range from barcode and quick response (QR) code scanners, to the use of radio-frequency identification (RFID) and location detection systems. Recently, interest has also increased in the use of robots, such as automated guided vehicles (AGVs) and autonomous mobile robots (AMR) in warehouse settings.

AGVs generally differ from AMRs by requiring the deployment of guides throughout the location, that an AGV uses for navigation purposes. For instance, an AGV may be guided by a deployed wire, magnetic strip, set of sensors, or the like. In other words, the paths of travel of AGVs are predefined and planned out in advance. AMRs, in contrast, are able to navigate the location in an autonomous manner by relying on a map of the location and onboard location-determining mechanisms, such as a Global Positioning System (GPS) receivers that operate of part of Simultaneous Localization & Mapping (SLAM) system. Thus, AMRs are typically easier to deploy and reconfigure than AGVs, but at the expense of requiring more complex on-board processing and sensors.

In many deployment scenarios, AMRs will be 'tasked' to perform a set of operations. This often involves the AMR travelling between points. Some AMRs maybe augmented with sensors that enable it to undertake a 'sensing task' while the AMR is in motion. Other AMRs may be tasked with the retrieval of an object from one location, then transporting that object to another location.

When AMRs are centrally-controlled, optimizing the paths of travel between locations and task lists of the AMRs is relatively straightforward. In this case, a server can compute the optimal distribution of workloads for the AMRs and push them to the AMRs in the field. In addition, the server can also push task or path changes to the AMRs, as needed, such as when orders change. However, a key observation is that most warehouses today are more archaic than many other locations (e.g., office buildings, schools, retail locations, etc.) in that they typically do not have the communication infrastructure in place to support continuous communication between the centralized-control system and the fleet of AMRs as they move through the environment.

While there are situations where continuous communication and control can be maintained, in order to address challenging environments, some AMR management systems operate on the premise that once 'dispatched,' the AMR may move autonomously throughout the location performing its tasks until completed. In such cases, the AMR will return to a dispatch point in order to get the next set of instructions. Such AMRs operate without consideration for the other AMRs, except to navigate around another AMR when it comes in contact with another AMR during its travels. Other AMRs are only treated as any obstacle would be treated.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
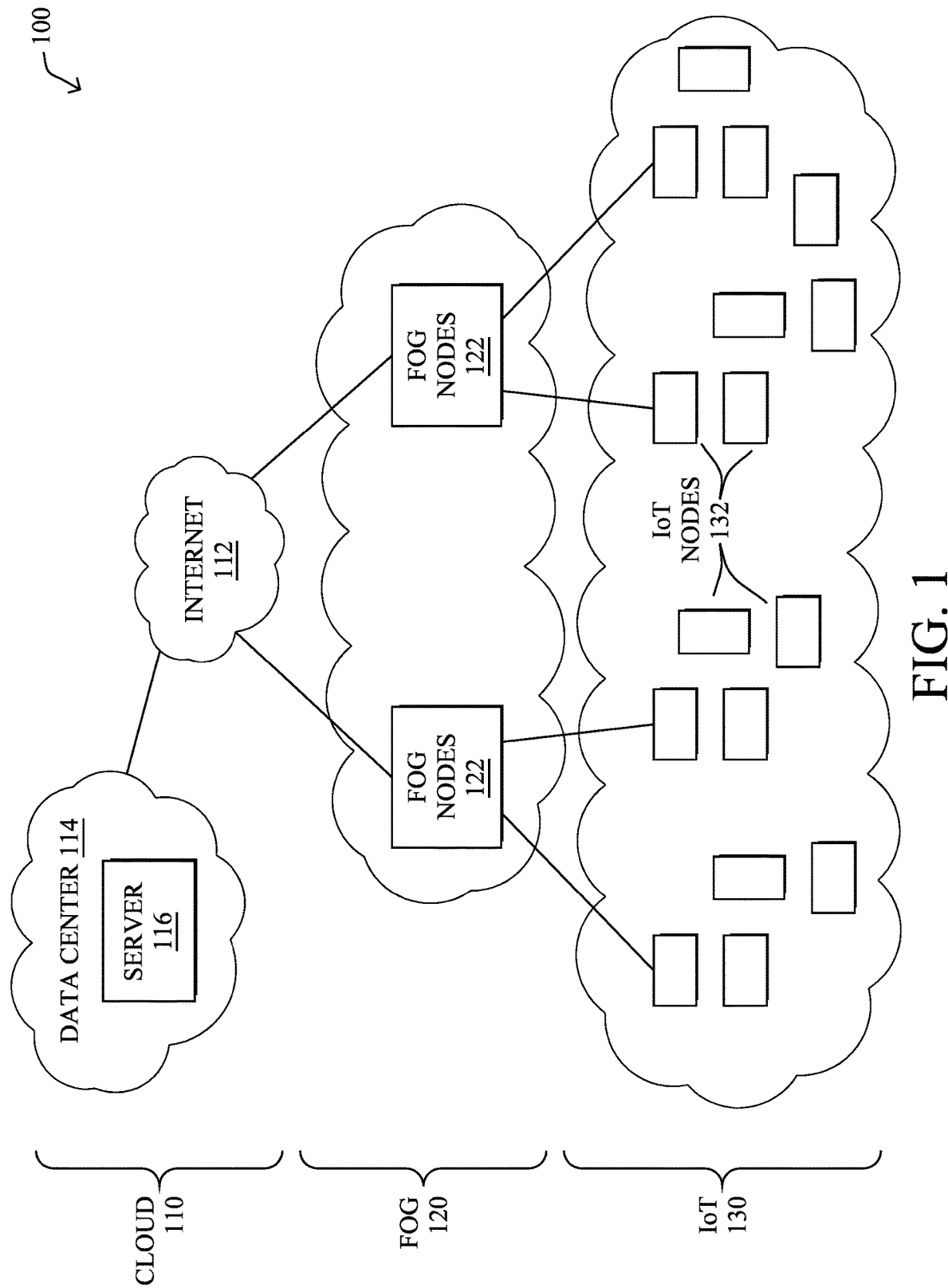
FIG. 1 illustrates an example network.

According to one or more embodiments of the disclosure, a first autonomous mobile robot (AMR) encounters a second AMR, while navigating a location. The first AMR receives, from the second AMR, a task list of the second AMR. The first AMR determines an adjustment to the task list of the second AMR, based in part on a comparison between the task list of the second AMR and a task list maintained by the first AMR. The first AMR sends, to the second AMR, the adjustment to the task list of the second AMR.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
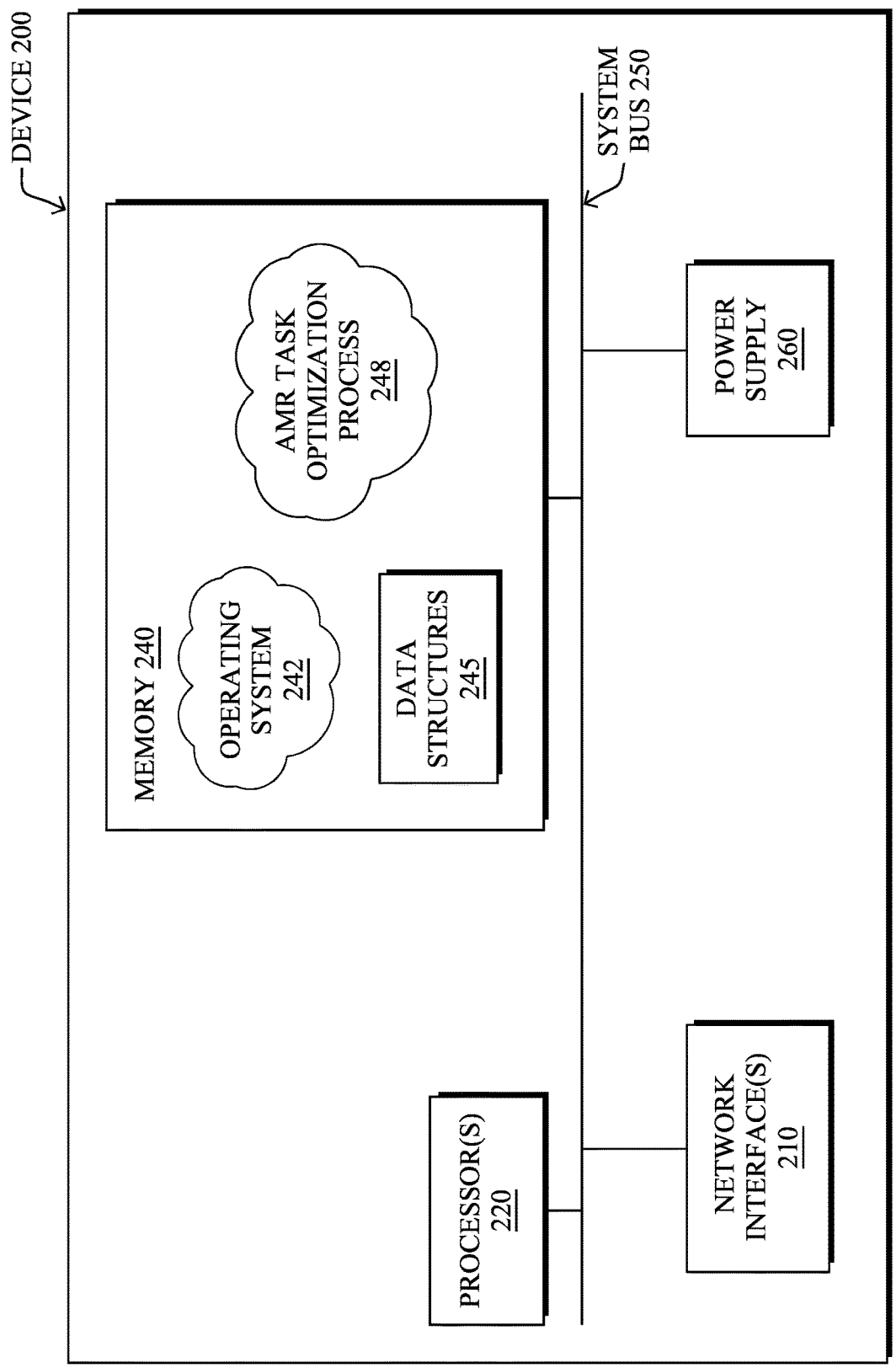
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise an autonomous moving robot (AMR) task optimization process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, AMR task optimization process 248 may employ any number of machine learning techniques, to optimize the task list(s) of AMR(s) deployed to a location, as described in greater detail below. In general, machine learning is concerned with the design and the development of techniques that receive empirical data as input (e.g., container data regarding the items, sensor data from the shipping route, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, AMR task optimization process 248 can use the model M to classify new data points, such as new sets to task lists to optimize, and the like. Often, M is a statistical model, and the cost function is inversely proportional to the likelihood of M, given the input data.

In various embodiments, AMR task optimization process 248 may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may instead look to whether there are sudden changes in the behavior of the system. Semi-supervised learning models take a middle ground approach that uses a greatly reduced set of labeled training data.

Example machine learning techniques that AMR task optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, stochastic gradient descent (SGD), or the like.

As noted above, modern warehouses are striving to improve productivity and efficiency. Key performance indicators in this context include "dock to dock time" (e.g., the amount of time between goods arriving and departing) and "pick and pack performance" (e.g., the amount of time taken between selecting an item and the item being ready for dispatch). To improve performance, warehouse operators are increasingly turning to the use of automation systems. These range from barcode and quick response (QR) code scanners, to the use of radio-frequency identification (RFID) and location detection systems. Recently, interest has also increased in the use of automated mobile robots (AMR) in warehouse settings.

In extreme examples, warehouses are fully automated, with all inventory being received, processed, and stored using a robotics system under the control of an intelligent management system. When inventory needs to be retrieved for onward transport, since all inventory items location is known, efficient picking routes are used with the inventory being delivered to packing systems where items are readied for shipment. However, such fully-automated warehouses are currently rare and are often built to satisfy a specific purpose. Retrofitting blanket data communications connectivity into existing warehouses is often very expensive and sometimes impossible. For this reason, the deployment of automated guided vehicles (AGVs) is also particularly challenging, as it requires retrofitting an existing warehouse.

AMRs typically work in conjunction with Warehouse Execution Systems (WES) and Enterprise Resource Planning (ERP) systems. Since the storage location of the items is known to the WES, an optimal 'pick route' can be determined using the information from the WES. More specifically, the AMR may be provided with the list of items that it is to collect and the order in which the AMR is to visit their respective storage locations. In some cases, the AMR may be able to determine the optimal 'pick route' for itself, in which case it will just receive the set of storage locations to be visited, with the optimization routine being executed locally on the AMR. Such ability often required additional computational capacity which may not be available to the AMR, hence the use of a centralized planning and optimization approach.

As many AMRs are not currently able to actually pick/collect a specific item on their own, deployments still frequently rely on human workers to load items to an AMR. In these types of deployments, the AMR may proceed along its determined path, stopping at any places at which a required item is to be found. In turn, the AMR may alert a worker stationed there to 'pick' the item and load it to the AMR. At this time, the worker may also scan the item, so as to track inventory in the warehouse and signal to the AMR that the particular item(s) have been picked and loaded.

Data network communications capable of supporting mobile assets such as AMRs within a warehouse are important. However, the very nature of warehouses presents certain challenges with respect to signal coverage and signal quality. Indeed, many warehouses are large, physical areas with various obstacles such as inventory, metal shelving, and the like, which may conflict with wireless signals of the network. As a result, communication coverage quality may vary greatly within the same warehouse. Moreover, many warehouses lack data networks throughout.

Some AMR systems receive their 'pick route' from the WES at a particular location within the warehouse where communications between an AMR and the WES can be established. Once the AMR has downloaded its pick route, it will proceed to execute the pick route until it has collected all of the specified items. The AMR may then move to an item drop-off location before returning to the location at which it is able to receive its next pick route. Of note, though, is that once the AMR has received its pick route, it will effectively proceed along the determined route and does not have an ability to change its path.

An alternative approach would be to keep the deployed AMRs in near-constant communication with the WES. In such cases, pick route updates are relatively trivial, as a new pick route can be pushed to an AMR at any time during its navigation of the warehouse. This means that an AMR may be able to divert from its current route, in order to pick a newly received order, if the AMR is nearby to the location of that item. This allows for greater optimization of the AMR system, as the task lists of the AMRs are able to be updated over time for purposes of efficiency. For many warehouses and other locations, though, this remains an unrealistic approach, due to either a total lack of network coverage or insufficient network coverage.

In cases in which centralized control is impractical or impossible, each AMR may operate in an autonomous manner, to complete its own set of tasks. This presents an opportunity for optimization, as some AMRs may be tasked with the same, similar, or complimentary tasks, that could otherwise be consolidated, were there fully-centralized control over the robots. For instance, consider the case in which a first AMR is sent on a route to pick a carton of tomato juice, a case of paper towels, and a box of soap. If another order comes in soon afterwards for another box of soap, a box of trash bags, a case of honey, and a bottle of washing detergent, the system may deploy a second AMR with this pick list. The route of the first AMR takes it close to the location of the washing detergent. It would therefore be beneficial for the first AMR to collect the washing detergent in order to fulfill the order, rather than the distance being covered by the second AMR. In order to able to take advantage of such optimizations, there needs to be an ability for AMRs to exchange 'pick list' information once dispatched.

Opportunistic Information and Inventory Exchange Via Serendipitous Encounters of Automated Mobile Robots The techniques herein introduce a distributed mechanism in which autonomous mobile robots (AMRs) leverage serendipitous encounters to exchange information and optimize their corresponding task lists. In some respects, the techniques herein are well-suited for use in locations lacking full network coverage and deployments in which the robots exhibit a degree of autonomy, making prediction of their actions extremely challenging.

Illustratively, the techniques described herein may be performed by hardware, software, and/or firmware, such as in accordance with the AMR task optimization process 248, which may include computer executable instructions executed by the processor 220 (or independent processor of interfaces 210) to perform functions relating to the techniques described herein.

Specifically, according to various embodiments, a first autonomous mobile robot (AMR) encounters a second AMR, while navigating a location. The first AMR receives, from the second AMR, a task list of the second AMR. The first AMR determines an adjustment to the task list of the second AMR, based in part on a comparison between the task list of the second AMR and a task list maintained by the first AMR. The first AMR sends, to the second AMR, the adjustment to the task list of the second AMR. Similarly, the operation may also occur vice-versa. Consideration is only given here to communications between two AMRs. However, it will be appreciated that more than two AMRs could also interact in this manner, were they to encounter each other as a group. In addition, either or both AMRs participating in the exchange may maintain a common record of the encounter and the task list adjustment(s), so that a central server (e.g., a WES, etc.) can be updated for reporting and rectification purposes, later on.

Operationally, FIGS. 3A-3D illustrate an example location 300 with deployed autonomous mobile robots (AMRs), according to various embodiments. For instance, location 300 may be a warehouse, dock, post office, distribution center, or any indoor or outdoor location in which items may be placed for storage and retrieved at a later time. In further embodiments, location 300 may take the form of a vehicle, such as the cargo hold of a ship, a trailer of a truck, the hold of an aircraft, or the like.

Figure 3A:
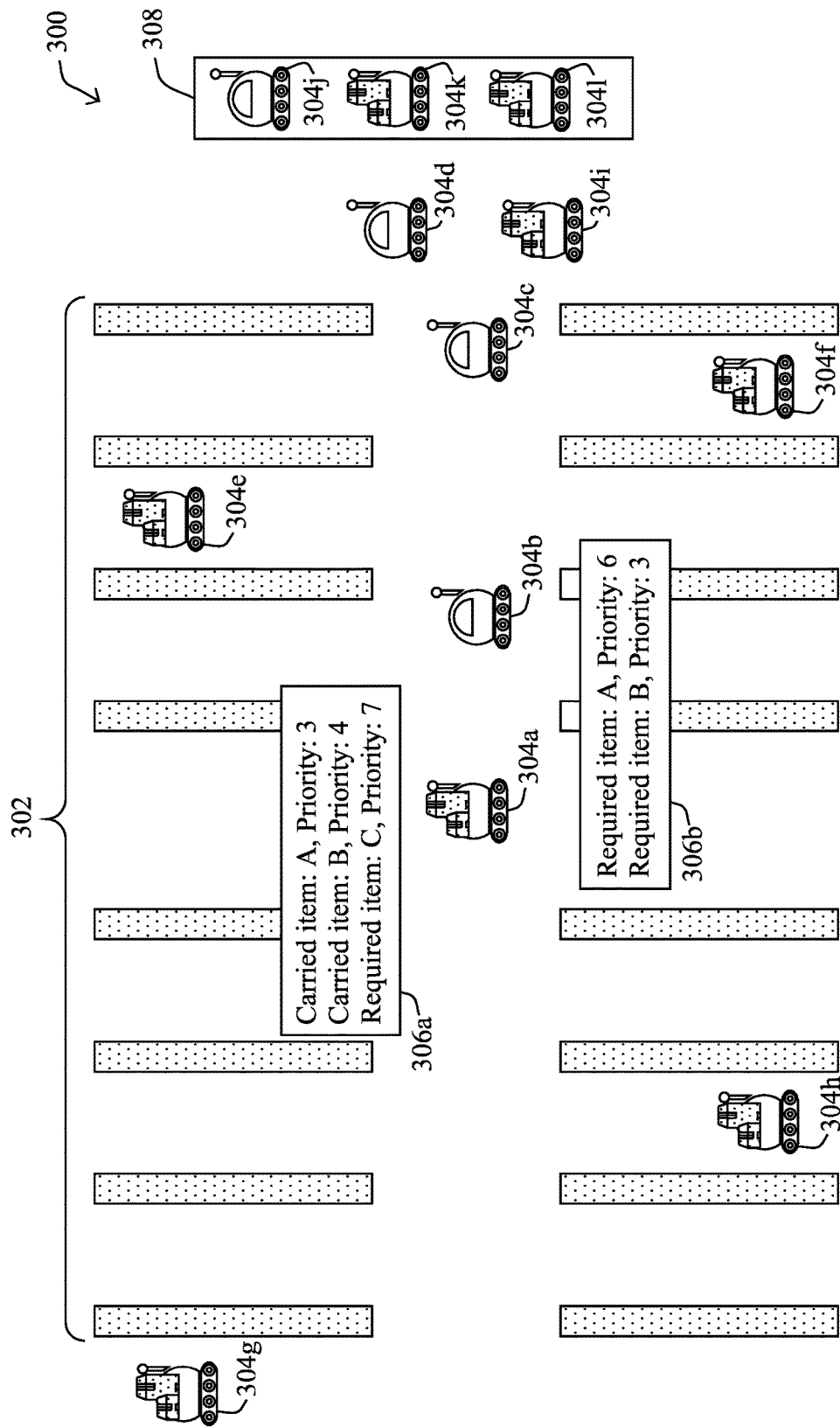
FIGS. 3A-3D illustrate an example location with deployed autonomous mobile robots (AMRs)

As shown in FIG. 3A, assume that a plurality of inventory racks 302 are distributed through location 300 in which items may be stored. As would be appreciated, inventory racks 302 are optional and other forms of storage systems may be deployed throughout location 300, in other cases. For instance, location 300 may also include containers, holding pens, or the like, in which various items may be stored. In various embodiments, a WES and/or ERP system may maintain information regarding the identities of the stored items, as well as their locations in location 300. For example, one particular inventory rack 302 may store boxes of soap, while another inventory rack 302 may store paper towels.

To aid in the storage and/or retrieval of the items in location 300, any number of AMRs 304 may be deployed to location 300. In general, each AMR 304 may include a propulsion system that propels the robot (e.g., an engine coupled to wheels, treads, etc.), one or more sensor systems (e.g., infrared, sonar, video, etc.), a communication system (e.g., wireless, hardwired port, etc.), and a computer control system coupled to the other systems that provides supervisory control over the other systems. In some embodiments, AMRs 304 may also include mechanisms to automatically load and/or unload items, such as forklifts, mechanical claws, or the like. In other embodiments, AMRs 304 may require the assistance of human workers to load and unload items to and from the AMRs.

In some instances, location 300 may also include a pack-out area 308 that has been designated as the place at which AMRs 304 are to unload their retrieved items. Preferably, pack-out area 308 is configured with network connectivity to allow AMRs 304 to communicate with the WES associated with location 300. This allows the WES to task any returning AMRs 304 with new tasks/pick lists that they are to complete, once their current set of items has been unloaded.

In general, a task list for a particular AMR 304 may indicate any or all of the following:
The set of item(s) that the AMR 304 is to collect within location 300—for instance, this information may include item identifiers (e.g., barcodes, RFID information, textual descriptions, etc.), quantities, their respective locations within location 300, any associated priorities, etc.
Navigation information—for instance, this may include information regarding the routes or paths of travel that the AMR 304 is to take, to navigate to the various items that it is to collect. In some embodiments, the navigation information may be downloaded to the AMR 304. In other embodiments, the AMR 304 itself may compute the navigation information based on the location(s) of the set of item(s) that it is to collect and map data for location 300.
Cargo information—the AMR 304 may also maintain information regarding which items, if any, that it is currently transporting. Such information may also double as status information for the set of item(s) that the AMR 304 has been tasked with collecting (e.g., the first two items have been collected and are being transported by the AMR 304, but there is still one or more item to collect).

In other words, the task list of a given AMR 304 may generally comprise its assigned pick route, and potentially other information, that it uses to control its navigation and actions within location 300.

As noted above, decentralized implementations of AMRs 304 typically entail each AMR 304 operating independently, to complete its assigned task list. Consequently, their operations are typically non-optimal. In order to address this optimization challenge, the techniques herein proposes that AMRs 304 be configured with the ability to exchange information with each other regarding their task lists, such as which items they are transporting, which items they still need to collect, and/or information regarding the routes that they intend to traverse. This provides the opportunity for the distributed execution of opportunistic pick-routes, rather than relying on centrally computed and determined routes.

In various embodiments, AMRs 304 may communicate directly with one another (e.g., without the assistance of an intermediate network), wirelessly. For instance, each AMR 304 may be equipped with one or more radio frequency (RF) transceivers, to exchange wireless packets with one another. In some cases, these communications may be made according to an existing wireless protocol such as, but not limited to, Bluetooth, Bluetooth Low Energy (BLE), Zigbee, Wi-Fi, or the like. In other embodiments, the communications between AMRs 304 may take the form of light-based communications, in the visible and/or invisible portion of the spectrum (e.g., infrared, ultraviolet, etc.). In yet other embodiments. AMRs 304 may communicate directly with one another using a wired connection, such as by physically coupling with one another.

According to various embodiments, as AMRs 304 navigate throughout location 300, to satisfy their respective task lists, they may serendipitously come into communication proximity of one another. Such serendipitous encounters depend on so many external and process factors that they would be very hard to anticipate or predict from a central system, under normal circumstances. However, in one embodiment, two or more AMRs 304 may encounter one another at a prearranged meeting place, where the pick routes of the two or more AMRs 304 intersect, and/or during a prearranged time window.

As would be appreciated there is a probabilistic chance that the items already picked and carried by one AMR 304 may also be required by another AMR 304 executing its own task list. Depending the location of a particular item within the warehouse and the time required for the AMR 304 to travel to that location, it may be optimal for the item to be exchanged from one AMR 304 to the other. Equally, it may be advantageous for an AMR 304 to be dispatched to a particular place in location 300, to collect an item for another AMR 304 or even to exchange portions of their task lists.

By way of example, assume in FIG. 3A that AMRs 304a-304l have been deployed within location 300. For illustrative purposes, further assume that AMR 304a has task list 306a that indicates that AMR 304a is carrying item A, which has a priority of 3, is also carrying item B, which has a priority of 4, and still needs to collect item C, which has a priority of 7. Similarly, assume that AMR 304b has task list 306b that indicates that it is to collect item A, with a priority of 6, as well as item B, with a priority of 3.

As AMR 304a and AMR 304b work towards completing their respective task lists 306a and 306b, they may serendipitously encounter each other (e.g., come within communication proximity of one another). In response to sensing the presence of the other AMR 304, such as through the use of video analytics, wireless beacons, or the like. AMR 304a and AMR 304b may exchange their respective task lists 306, according to various embodiments. In turn, either or both of AMR 304a-304b may compare task lists 306a-306b and apply an optimization algorithm to the compared lists, to determine an adjustment to either or both of task lists 306a-306b. The adjustment(s) may then be communicated back to the other AMR 304 for implementation.

In various embodiments, the optimization algorithm used to adjust task lists 306 may take the form of an algorithm that seeks to optimize a defined objective function. Such an objective function may, for instance, take into account the current inventories of the AMRs 304 involved, the priorities associated with the items, travel times, or the like. In other embodiments, the optimization may be collaborative in nature between AMRs 304a-304b, such as employing a bidding mechanism in which each AMR 304 'bids' for the ability to take over a particular item or pass a retrieval task to the other AMR 304. As would be appreciated, other optimization approaches are also possible and can be implemented within the framework introduced herein without undue experimentation.

By way of example, a potential adjustment to task lists 306a-306b may be for AMR 304a to hand off item A to AMR 304b, since task list 306b of AMR 304b indicates a much higher priority for item A than that of task list 306a. Such a handoff may be performed automatically between AMRs 304a-304b or a nearby worker alerted to facilitate the item exchange, depending on the capabilities of AMRs 304a-304b.

Figure 3B:
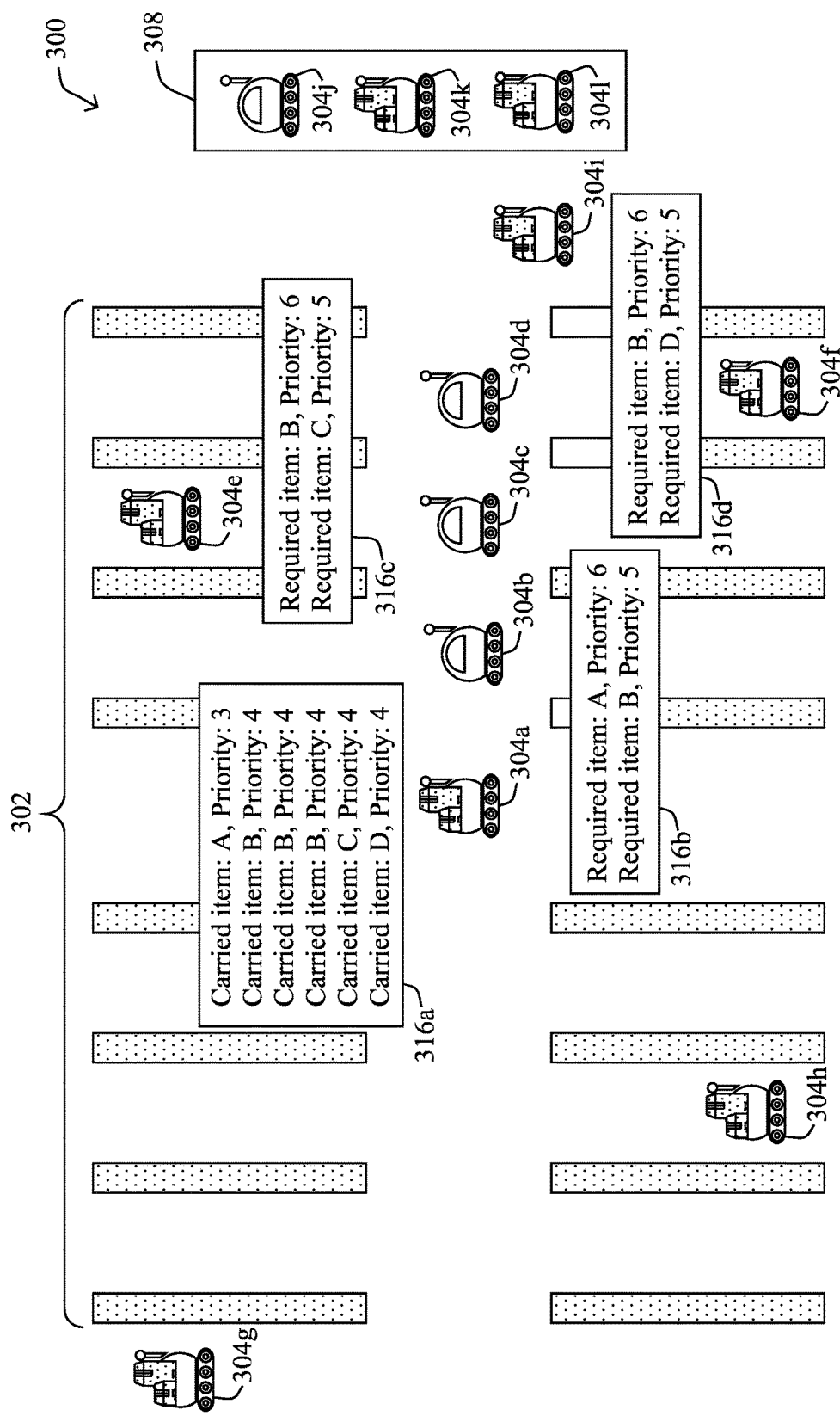

In the example shown in FIG. 3B, consider the case in which AMR 304a has collected the following, as indicated by its task list 316a:

Item A. Quantity: 1, Priority 3
Item B. Quantity: 3, Priority 4
Item C, Quantity: 1. Priority 4
Item D. Quantity: 1, Priority 4

In other words. AMR 304a may be transporting multiple items of type B.

Also as shown in FIG. 3B, assume that AMRs 304b-304d have also been dispatched with their respective task lists 316b-316d. More specifically. AMR 304b may be tasked with collecting item A with priority 6 and item B with priority 5, AMR 304c may be tasked with collecting item B with priority 6 and item C with priority 5, and AMR 304d may be tasked with collecting item B with priority 6 and item D with priority 5. As AMRs 304a-304d encounter each other, they may exchange their task lists 316a-316d. By comparing their tasks lists 316, it may be determined that AMR 304a should transfer its three copies of item B to AMRs 304b-304d, its item A to AMR 304b, its item C to AMR 304c, and item D to AMR 304d. Indeed, AMR 304a simply returning its collected items A-D to pack-out area 308 will result in a cumulative priority of 3+4+4+4+4+4=23 being satisfied. However, transferring the items from AMR 304a to AMRs 304b-304d will result in a cumulative priority of 6+5+6+5+6+5=33 being satisfied, instead, as AMRs 304b-304d can then return to pack-out area 308.

In other embodiments, another form of adjustment to the task list of an AMR 304 may not require the transference of an item from one AMR 304 to another. Indeed, in some instances, it may still present an optimization for one AMR 304 to update the pick list of another AMR 304 that it encounters.

Figure 3C:
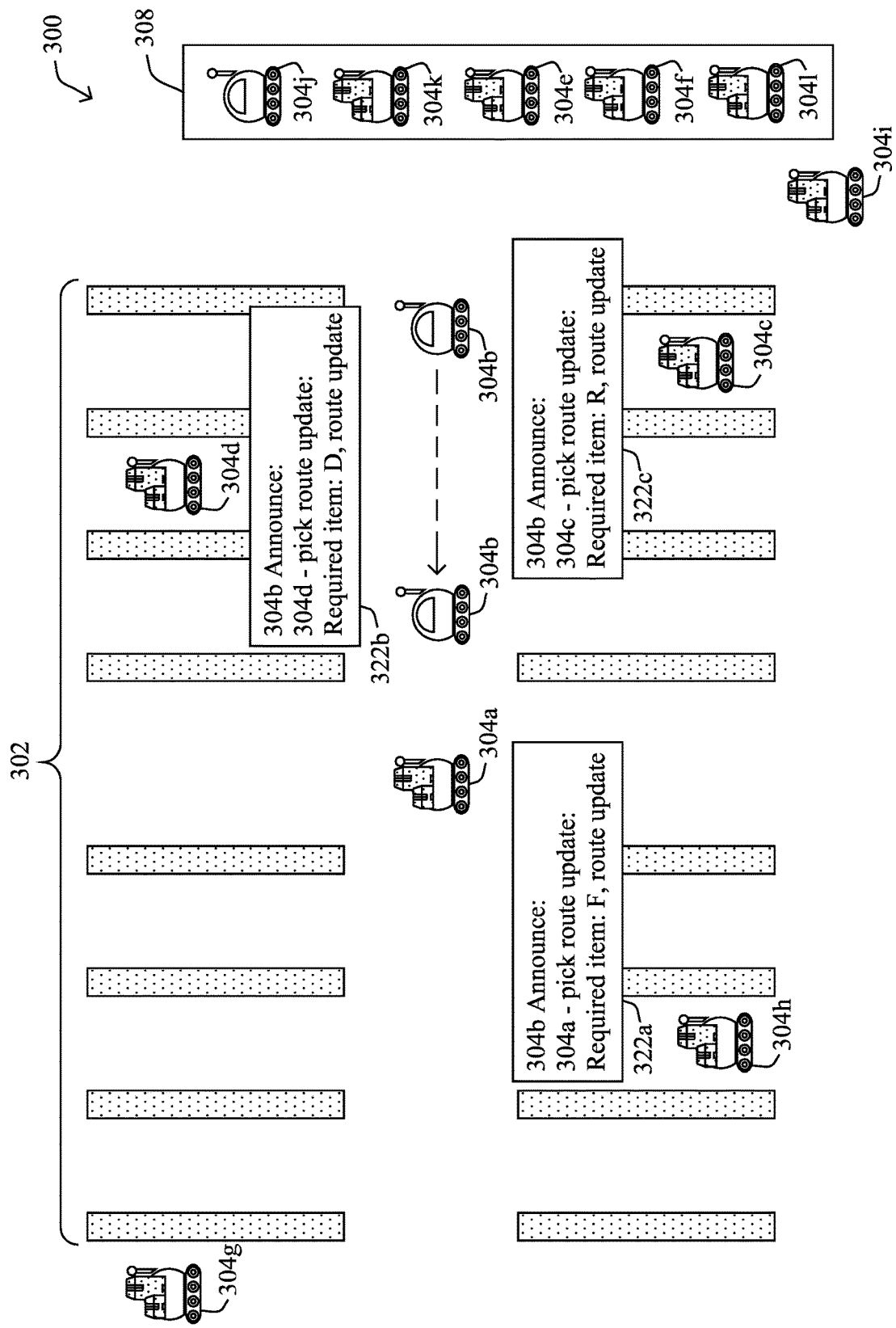

FIG. 3C illustrates an example of the updating of a pick list of one AMR 304 by another AMR 304 that it encounters, according to various embodiments. As shown, assume that AMR 304b has recently departed pack-out area 308 with a new pick list/task list. As AMR 304b navigates location 300 towards its destination, it may come within communication proximity of AMRs 304a. 304c, and 304d, over the course of time. When AMR 304b comes within proximity of AMR 304c, it may send out an announcement 322c that adjusts the task list of AMR 304c such that AMR 304c now also must collect item R and update its route to collect that item. Similarly, as AMR 304b comes within proximity of AMR 304d, it may send an announcement 322b that adjusts the task list of AMR 304d such that AMR 304d must now collect item D. Finally, as AMR 304b encounters AMR 304a, it may send an announcement 322a that adjusts the task list of AMR 304a such that AMR 304a must now collect item F, as well.

Sine the encounters between AMRs 304 are serendipitous, their data exchanges are ephemeral, are not centrally computed, and may not be stored, necessarily. In some cases, however, the exchanges may be logged for subsequent analysis and reporting.

In further embodiments, some AMRs 304 may be designated as 'supervisors' and may not be tasked with carrying inventory at all, but are instead exclusively used to facilitate opportunist edge optimizations. Such AMRs 304 may seek to maximize their serendipitous encounters with other AMRs 304, in order to collect as much information as possible as to the state-of-play 'on the ground.' In turn, a supervisor AMR 304 may then use its collected information to apply edge optimizations to the task lists of its encountered AMRs, such as by instructing encountered AMRs 304 to swap or transfer inventory with other encountered AMRs.

Figure 3D:
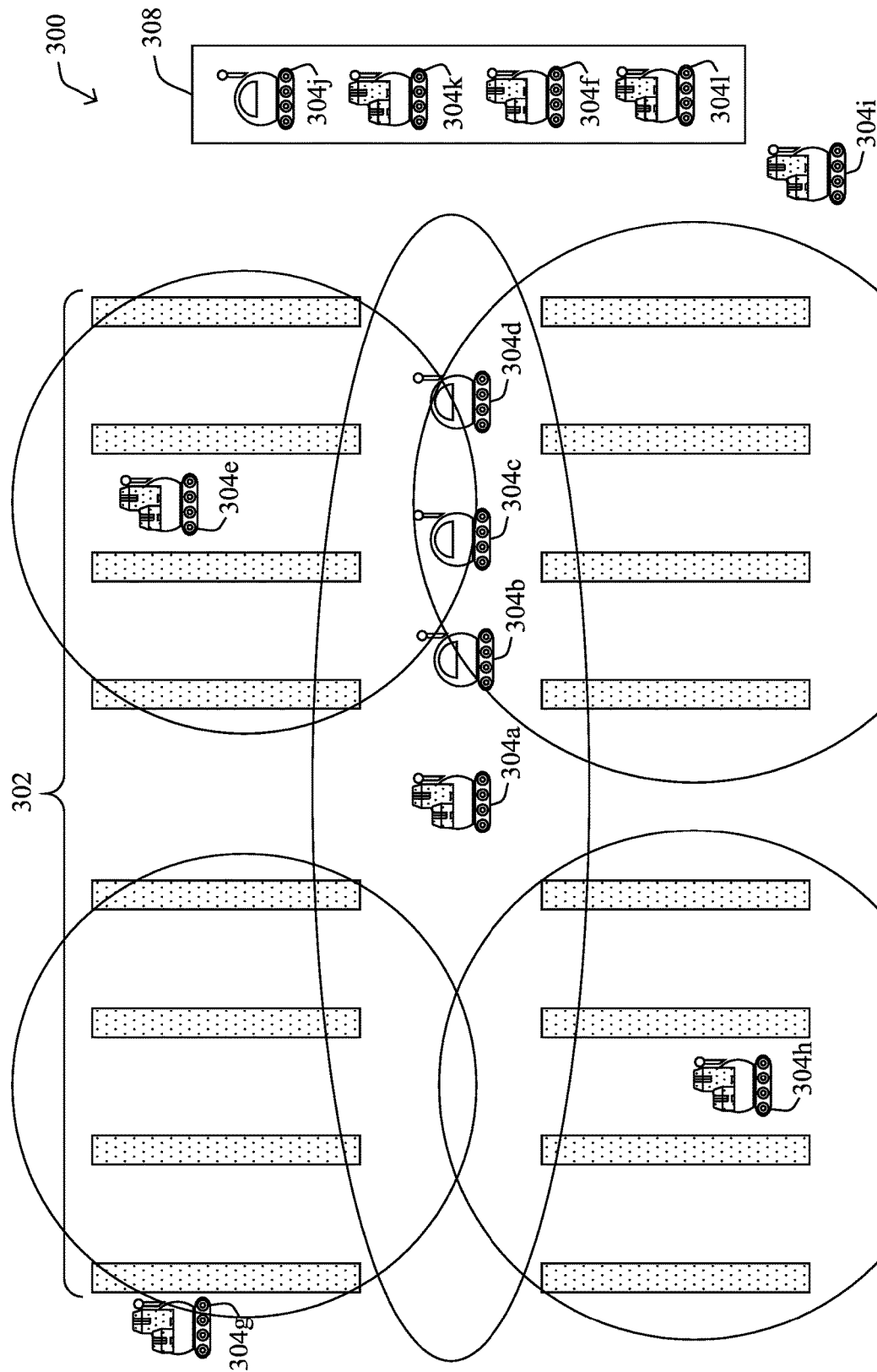

As shown in FIG. 3D, for example, certain AMRs 304 may be designated as supervisors that 'patrol' designated portions of location 300, so as to increase the likelihood of encountering other AMRs 304 that are tasked with collecting the same or similar items. For instance, AMR 304g may patrol a certain portion of location 300 in which electronic devices are located, allowing for the potential to optimize the collection of such items by other AMRs 304 that it encounters. Said differently, by learning the task lists of the other AMRs 304 that it encounters over time, AMR 304g can use this information to adjust the task lists of other AMRs 304, to optimize the process. Such optimizations would otherwise be nigh impossible to predict and anticipate, under most circumstances.

Figure 4:
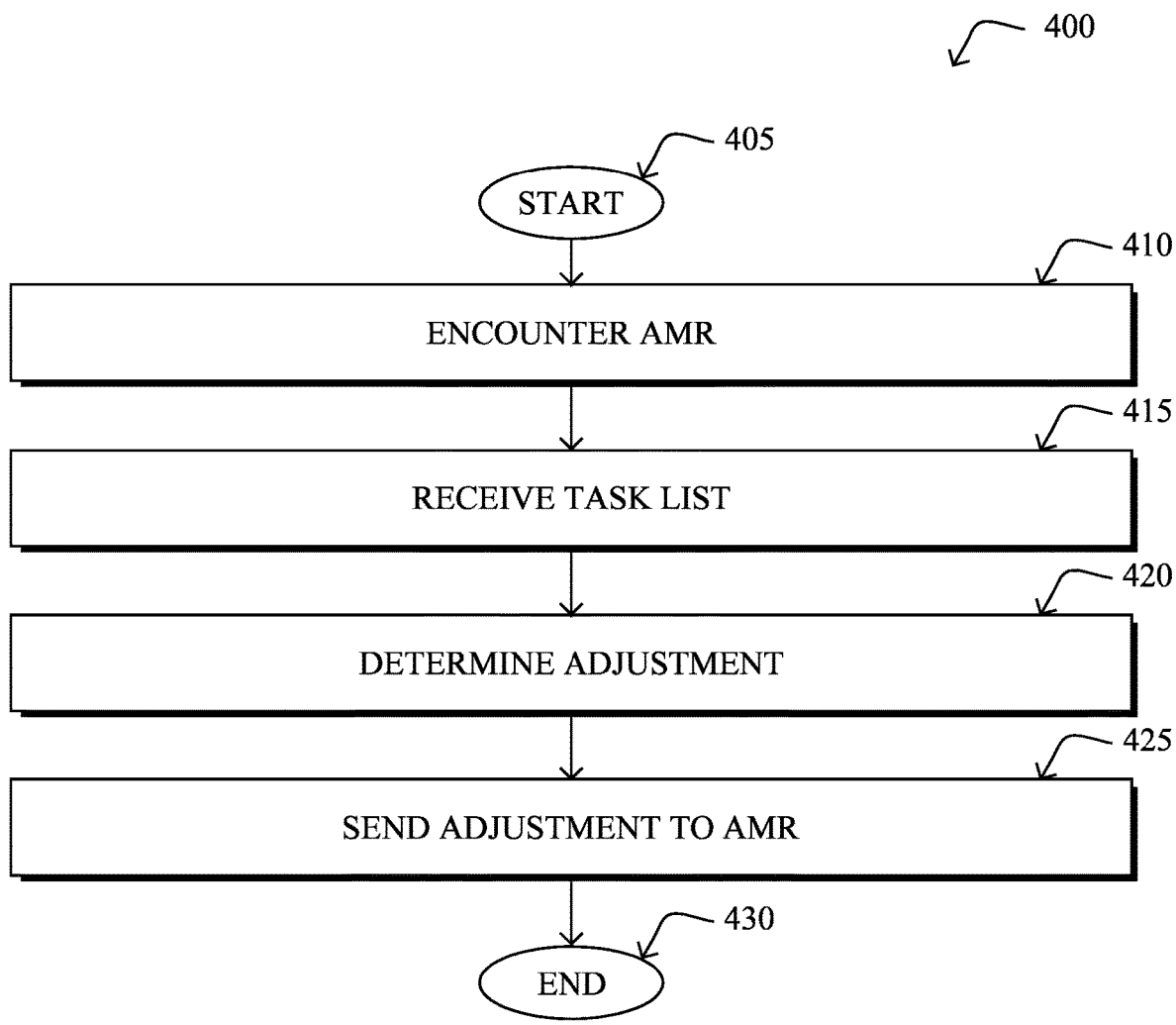
FIG. 4 illustrates an example simplified procedure for the opportunistic exchange of information between AMRs.

FIG. 4 illustrates an example simplified procedure for the opportunistic exchange of information between AMRs, in accordance with one or more embodiments described herein. In various embodiments, a non-generic, specifically configured device (e.g., device 200) may perform procedure 400 by executing stored instructions (e.g., process 248), such as a first AMR or another device in communication therewith. The procedure 400 may start at step 405, and continues to step 410, where, as described in greater detail above, the first AMR may encounter a second AMR while navigating a location, such as a warehouse, dock, post office, or other location in which items are stored. In some instances, the encounter may be random, as the first and second AMRs are traversing the location. In other embodiments, the encounter may occur at a prearranged place and/or time in the location.

As step 415, as detailed above, the first AMR may receive, from the second AMR, a task list of the second AMR. In various embodiments, the task list of the second AMR may indicate a set of one or more items to be collected by the second AMR, an intended route of travel that the second AMR intends to travel, and a manifest of any items being transported by the second AMR. In many embodiments, the first AMR may receive the task list directly from the second AMR, either wirelessly or by coupling directly with the second AMR. In other words, the first AMR and second AMR may communicate with one another without requiring an intermediate connection to a network.

At step 420, the first AMR may determine an adjustment to the task list of the second AMR, based in part on a comparison between the task list of the second AMR and a task list maintained by the first AMR, as described in greater detail above. In general, the first AMR may apply an optimization to the task lists, to determine an optimal set of items for delivery and paths to traverse for each of the AMRs. Note that this optimization can also be performed collaboratively with the second AMR. For instance, the adjustment may entail removing a particular item from the task list of the second AMR and adding the particular item to the task list maintained by the first AMR. In another example, the adjustment may entail adding a particular item to the task list of the second AMR and removing the particular item to the task list maintained by the first AMR. In some embodiments, the task list maintained by the AMR may actually be for another AMR, such as a third AMR. For instance, the first AMR may be designated as an optimizer that navigates the location in an attempt to optimize the task lists of other AMRs.

At step 425, as detailed above, the first AMR may send, to the second AMR, the adjustment to the task list of the second AMR. For instance, say the first and second AMRs are both charged with picking a single quantity of paper towels from a shelf. In such a case, an optimization can be achieved by consolidating these tasks into a single task for the second AMR in which the second AMR is instructed to pick two quantities of paper towels instead of one. Doing so frees up resources for the first AMR while consuming little additional resources of the second AMR. Procedure 400 then ends at step 430.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for AMRs deployed to a location to optimize their task lists, even in the absence of network connectivity. This provides AMRs the ability to exchange items and/or information on the basis of a probabilistic and opportunistic meeting. As AMRs pass through a location, there will be certain areas at which AMRs are more likely to encounter each other (e.g., main thoroughfares), increasing the chances that item exchanges may be advantageous.

The ability to take advantage of item and task exchanges is especially valuable in large warehouses, where an AMR may otherwise be expected to navigate a considerable distance to collect all of its items. If one considers the route distances where routes always start and end at a pack-out location, having AMRs primarily serve a zone within the warehouse but still have the ability to return to the pack-out area may be extremely valuable.

A further advantage of the techniques herein may be the ability to select items based on the probabilistic likelihood that another AMR will have a pick route containing the particular item, even when they are not specifically tasked with picking up that item. Indeed, WES systems may accumulate knowledge over time of the most frequently required items, making it possible to task an AMR to collect more than just the items that are immediately required, based on an assumption that another passing AMR is likely to need that item, since it also appears on the pick route. This decision allows the system to take a balanced approach that balances out the added cost of carrying a redundant item with the probabilistic chance of saving another AMR time to execute its pick-route.

Finally, the techniques herein also leverage the distributed state and knowledge of the AMRs, with decisions being taken by the individual AMRs, yet relying on their positional state, their tasked pick-routes, currently carried inventory, and progress through the pick-route. This allows the optimizations to occur, even when there are intermittent communications between the AMRs and a centralized controller (e.g., a WES), meaning that the WES may not have continuous, real-time information.

While there have been shown and described illustrative embodiments for opportunistic information and inventory exchange via serendipitous encounters of AMRs, it is to be understood that various other adaptations and modifications may be made within the intent and scope of the embodiments herein. For example, while specific types of locations are described herein, the techniques herein are not limited as such and can be applied to any indoor or outdoor location in which items are stored and/or retrieved. Further, while the techniques herein are described primarily with respect to ground-based AMRs, the techniques herein may be equally applied to flying or submersible robots, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:

encountering, by a first autonomous mobile robot, a second autonomous mobile robot, while navigating a location;

receiving, at the first autonomous mobile robot and from the second autonomous mobile robot, a task list of the second autonomous mobile robot;

determining, by the first autonomous mobile robot, an adjustment to the task list of the second autonomous mobile robot, based in part on a comparison between the task list of the second autonomous mobile robot and a task list maintained by the first autonomous mobile robot, and based further on priorities associated with items indicated in the task list of the second autonomous mobile robot and the task list maintained by the first autonomous mobile robot; and sending, by the first autonomous mobile robot and to the second autonomous mobile robot, the adjustment to the task list of the second autonomous mobile robot, wherein the adjustment is configured to divert the second autonomous mobile robot from a portion of a path of its pick route along which the second autonomous mobile robot picks up items from the task list of the second autonomous mobile robot to deliver to their corresponding delivery locations, to take over, from the first autonomous mobile robot, collection and delivery of an item associated with the task list maintained by the first autonomous mobile robot to its corresponding delivery location.

2. The method as in claim 1, wherein the task list of the second autonomous mobile robot indicates a set of one or more items to be collected by the second autonomous mobile robot, an intended route of travel that the second autonomous mobile robot intends to travel, and a manifest of any items being transported by the second autonomous mobile robot.

3. The method as in claim 1, further comprising:
navigating the location, by the first autonomous mobile robot, based on the task list maintained by the first autonomous mobile robot.

4. The method as in claim 1, wherein the first autonomous mobile robot communicates directly with the second autonomous mobile robot.

5. The method as in claim 1, wherein the adjustment to the task list of the second autonomous mobile robot comprises removing a particular item from the task list of the second autonomous mobile robot and adding the particular item to the task list maintained by the first autonomous mobile robot.

6. The method as in claim 1, wherein the adjustment to the task list of the second autonomous mobile robot comprises adding a particular item to the task list of the second autonomous mobile robot and removing the particular item to the task list maintained by the first autonomous mobile robot.

7. The method as in claim 1, wherein the first autonomous mobile robot encounters the second autonomous mobile robot randomly in the location.

8. The method as in claim 1, wherein the first autonomous mobile robot encounters the second autonomous mobile robot at a prearranged place in the location.

9. The method as in claim 1, wherein the task list maintained by the first autonomous mobile robot is a task list of a third autonomous mobile robot, and wherein the first autonomous mobile robot is configured to navigate the location in an attempt to optimize task lists of other autonomous mobile robots.

10. The method as in claim 1, further comprising:
providing, by the first autonomous mobile robot and to the second autonomous mobile robot, an item being transported by the first autonomous mobile robot, wherein the adjustment to the task list of the second autonomous mobile robot includes an indication of that item.

11. An apparatus, comprising:
one or more interfaces;
a processor coupled to the one or more interfaces and configured to execute one or more processes; and
a memory configured to store a process that is executable by the processor, the process when executed configured to:
encounter an autonomous mobile robot, while navigating a location;
receive, from the autonomous mobile robot, a task list of the autonomous mobile robot;
determine an adjustment to the task list of the autonomous mobile robot, based in part on a comparison between the task list of the autonomous mobile robot and a task list maintained by the apparatus, and based further on priorities associated with items indicated in the task list of the autonomous mobile robot and the task list maintained by the apparatus; and
send, to the autonomous mobile robot, the adjustment to the task list of the autonomous mobile robot, wherein the adjustment is configured to divert the autonomous mobile robot from a portion of a path of its pick route along which the autonomous mobile robot picks up items from the task list of the autonomous mobile robot to deliver to their corresponding delivery locations, to take over, from the apparatus, collection and delivery of an item associated with the task list maintained by the apparatus to its corresponding delivery location.

12. The apparatus as in claim 11, wherein the task list of the autonomous mobile robot indicates a set of one or more items to be collected by the autonomous mobile robot, an intended route of travel that the autonomous mobile robot intends to travel, and a manifest of any items being transported by the autonomous mobile robot.

13. The apparatus as in claim 11, wherein the process when executed is further configured to:
navigating the apparatus within the location, based on the task list maintained by the apparatus.

14. The apparatus as in claim 11, wherein the apparatus communicates directly with the autonomous mobile robot.

15. The apparatus as in claim 11, wherein the adjustment to the task list of the autonomous mobile robot comprises removing a particular item from the task list of the autonomous mobile robot and adding the particular item to the task list maintained by the apparatus.

16. The apparatus as in claim 11, wherein the adjustment to the task list of the autonomous mobile robot comprises adding a particular item to the task list of the autonomous mobile robot and removing the particular item to the task list maintained by the apparatus.

17. The apparatus as in claim 11, wherein the apparatus encounters the autonomous mobile robot randomly in the location.

18. The apparatus as in claim 11, wherein the task list maintained by the apparatus is a task list of a second autonomous mobile robot, and wherein the apparatus is configured to navigate the location in an attempt to optimize task lists of other autonomous mobile robots.

19. The apparatus as in claim 11, wherein the process when executed is further configured to:
provide, to the autonomous mobile robot, an item being transported by the apparatus, wherein the adjustment to the task list of the autonomous mobile robot includes an indication of that item.

20. A tangible, non-transitory, computer-readable medium storing program instructions that cause a first autonomous mobile robot to execute a process comprising:
encountering, by the first autonomous mobile robot, a second autonomous mobile robot, while navigating a location;
receiving, at the first autonomous mobile robot and from the second autonomous mobile robot, a task list of the second autonomous mobile robot;
determining, by the first autonomous mobile robot, an adjustment to the task list of the second autonomous mobile robot, based in part on a comparison between the task list of the second autonomous mobile robot and a task list maintained by the first autonomous mobile robot, and based further on priorities associated with items indicated in the task list of the second autonomous mobile robot and the task list maintained by the first autonomous mobile robot; and
sending, by the first autonomous mobile robot and to the second autonomous mobile robot, the adjustment to the task list of the second autonomous mobile robot, wherein the adjustment is configured to divert the second autonomous mobile robot from a portion of a path of its pick route along which the second autonomous mobile robot picks up items from the task list of the second autonomous mobile robot to deliver to their corresponding delivery locations, to take over, from the first autonomous mobile robot, collection and delivery of an item associated with the task list maintained by the first autonomous mobile robot to its corresponding delivery location.

* * * * *